United States Patent
Labadie et al.

(10) Patent No.: US 11,912,063 B2
(45) Date of Patent: *Feb. 27, 2024

(54) AERODYNAMIC WHEELS FOR A BI-DIRECTIONAL VEHICLE

(71) Applicant: Zoox, Inc., Foster City, CA (US)

(72) Inventors: Christopher William Labadie, San Francisco, CA (US); Timothy David Kentley-Klay, Stanford, CA (US)

(73) Assignee: ZOOX, INC., Foster City, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/086,647

(22) Filed: Nov. 2, 2020

(65) Prior Publication Data

US 2021/0114405 A1 Apr. 22, 2021

Related U.S. Application Data

(63) Continuation of application No. 15/968,403, filed on May 1, 2018, now Pat. No. 10,821,776.

(51) Int. Cl.
  *B60B 19/10* (2006.01)
  *B60B 3/10* (2006.01)
  *F16D 65/807* (2006.01)
  *F16D 65/847* (2006.01)

(52) U.S. Cl.
  CPC ............. *B60B 19/10* (2013.01); *B60B 3/10* (2013.01); *B60B 2900/1216* (2013.01); *B60B 2900/513* (2013.01); *F16D 65/807* (2013.01); *F16D 65/847* (2013.01); *G05D 2201/0213* (2013.01)

(58) Field of Classification Search
  CPC ......... B60B 19/10; B60B 3/10; B60B 7/0086; B60B 2900/513; F16D 65/807; F16D 65/847

See application file for complete search history.

(56) References Cited

U.S. PATENT DOCUMENTS

| | | | | |
|---|---|---|---|---|
| 2,022,041 | A * | 11/1935 | Kliesrath | B60B 19/10 301/37.104 |
| 4,503,944 | A * | 3/1985 | Burckhardt | F16D 65/128 301/108.3 |
| 5,324,099 | A | 6/1994 | Fitzhugh | |
| 5,820,203 | A | 10/1998 | Morelli et al. | |
| 8,333,438 | B2 | 12/2012 | Caule | |
| 9,636,943 | B2 * | 5/2017 | Connolly | B60B 1/044 |
| 10,661,602 | B2 * | 5/2020 | Friske | B60B 7/01 |
| 10,753,414 | B2 * | 8/2020 | Zelenak | B60B 21/106 |
| 10,821,776 | B1 * | 11/2020 | Labadie | B60T 5/00 |
| 2009/0195053 | A1 | 8/2009 | Kruse et al. | |
| 2009/0236902 | A1 * | 9/2009 | Zibkoff | B60B 21/062 301/104 |
| 2021/0206199 | A1 * | 7/2021 | Baigh | F04D 29/388 |

* cited by examiner

*Primary Examiner* — Jason R Bellinger
(74) *Attorney, Agent, or Firm* — Lee & Hayes, P.C.

(57) ABSTRACT

An arrangement of wheels for a bi-directional vehicle may decrease the drag coefficient for the vehicle regardless of a direction of travel of the vehicle. A pair of wheels, each wheel of the pair having a configuration of fins to promote a desired aerodynamic effect, when located at a leading end of the vehicle promotes airflow laterally outboard of the vehicle body. In contrast, the same pair of wheels, when located at a trailing end of the vehicle promotes airflow laterally inboard of the vehicle body.

17 Claims, 6 Drawing Sheets

AERODYNAMIC WHEELS FOR A BI-DIRECTIONAL VEHICLE

CROSS REFERENCE TO RELATED APPLICATIONS

This application is a continuation of and claims priority to U.S. patent application Ser. No. 15/968,403, filed May 1, 2018, which issued as U.S. Pat. No. 10,821,776, on Nov. 3, 2020, and which is fully incorporated herein by reference.

BACKGROUND

A vehicle's overall shape has a direct impact on the aerodynamics of the vehicle. Conventional vehicles are generally configured to have a defined front end and a defined rear end, with the front end being the leading end during normal travel. It follows, then, that a vehicle's body shape is conventionally designed for this single direction of travel. For example, in some conventional designs, the front end may be shaped to promote laminar airflow along the vehicle body, whereas the rear end may be shaped to promote detachment of the same airflow from the vehicle body, e.g., via a spoiler. In addition, some vehicles have introduced wheel designs, e.g., wheel covers, that may reduce a drag coefficient of the vehicle, for example, by covering openings in a rim of the vehicle.

DETAILED DESCRIPTION

Figure 1:
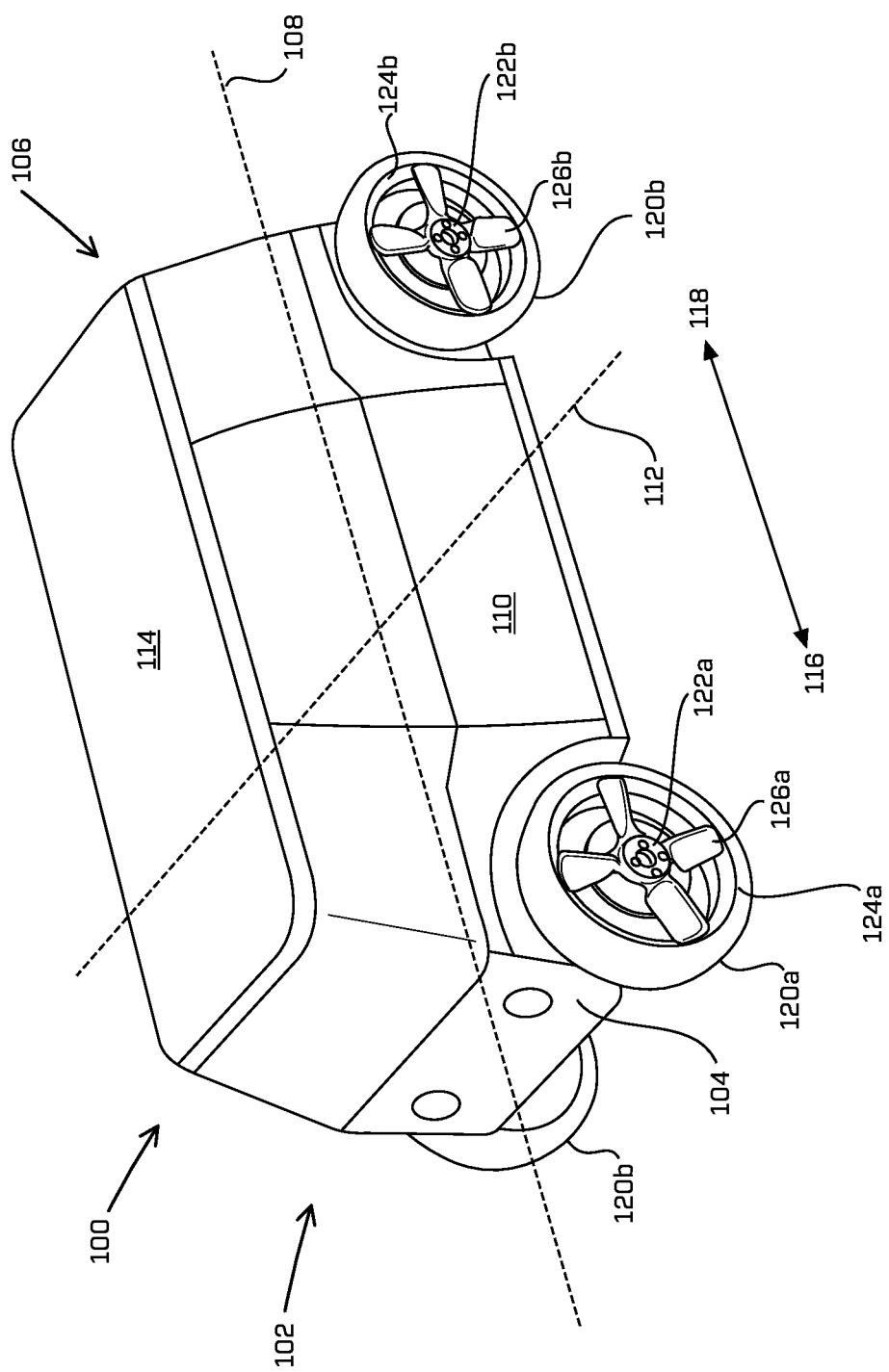
FIG. 1 is a perspective view of a vehicle, such as a bi-directional autonomous vehicle, according to implementations of this disclosure.

The following detailed description is directed to aerodynamic vehicle design, and more particularly to wheels and wheel arrangements that may impart desirable performance characteristics to a vehicle regardless of the direction of travel of the vehicle.

As a brief example, some vehicles may have bi-directional functionality, e.g., they may be configured to move forward in each of opposite directions. However, conventional aerodynamic designs and techniques are generally optimized for travel in a single direction. For example, a conventional spoiler projects from a trailing end of a vehicle to alter airflow as it passes the vehicle, e.g., to decrease drag. But, when that vehicle travels in reverse, such that the spoiler is at a leading end of the vehicle, the spoiler increases drag, which is undesirable. Thus, bi-directional vehicles are often designed to achieve a same drag coefficient regardless of forward direction, for example, by having a longitudinally-symmetrical outer surface. Minimizing a drag coefficient of these designs has conventionally been challenging, however, because a benefit in one direction may be a detriment in the opposite direction.

According to implementations of this disclosure, however, a wheel arrangement is described that may decrease the drag coefficient of the vehicle (e.g., relative to the vehicle with conventional wheels) when the vehicle travels in a first direction, and when the vehicle travels in an opposite, second direction. For example, in implementations of this disclosure, the wheels of a vehicle may be provided with features that affect the flow of air at the wheels. The effect on the airflow when a given wheel is a leading wheel, e.g., arranged proximate a leading end of the vehicle, and the effect on the airflow when the wheel is a trailing wheel, e.g., arranged proximate a trailing end of the vehicle, may both act to reduce overall drag of the vehicle. For example, in some examples, the aerodynamic features may cause airflow at the leading wheels of the vehicle to move relatively outwardly from the vehicle, e.g., away from the longitudinal axis of the vehicle, and may cause airflow at the trailing wheels of the vehicle to move relatively towards the longitudinal axis of the vehicle. In some implementations, these effects may be achieved at the respective leading and trailing wheels, regardless of the direction of travel. For example, this effect may be achieved by providing four wheels, with two of the wheels being diagonally disposed relative to each other and having the same, first features, and the other two of the wheels being diagonally disposed relative to each other and having the same, second features.

In some implementations, the aerodynamic features may comprise one or more fins. For example, each of the wheels may include a hub and a rim spaced from the hub, with the features being disposed proximate an opening between the hub and the rim. The fins may act on ambient air to force the air through the opening. For example, the fins may be tilted or twisted relative to a normal plane, e.g., to act as blades, that impart a lateral movement direction on the airflow. In some examples, the fins may be configured as or integrated into spokes, generally extending all the way from the hub to the rim. In other implementations, the fins may be separate from spokes of the wheel.

The techniques and systems described herein may be implemented in several ways. Example implementations are provided below with reference to the figures.

FIG. 1 shows an example vehicle 100 configured to move in an environment. The vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. This is merely an example, and the systems and methods described herein may be incorporated into any ground-borne vehicle, including those ranging from vehicles that need to be manually controlled by a driver at all times, to those that are partially- or fully-autonomously controlled.

The vehicle 100 may be powered by one or more internal combustion engines, one or more electric motors, hydrogen power, any combination thereof, and/or any other suitable power source(s). In the illustrated example, the vehicle 100 includes a body 102. The body 102 generally includes a first end 104 and a second end 106 spaced from the first end 104 along a longitudinal axis 108 of the vehicle 100. The vehicle body 102 also includes opposite sides 110 (only one of which is illustrated) spaced from each other along a lateral axis 112 such that one of the sides 110 is on either side of the longitudinal axis 108. The body 102 also includes a roof 114. Although a certain body styling is illustrated, the example vehicle 100 may be any configuration of vehicle, such as, for example, a van, a sport utility vehicle, a cross-over vehicle, a truck, a bus, an agricultural vehicle, and a construction vehicle.

The example vehicle 100 may have four-wheel steering and may operate generally with equal performance characteristics in all directions. For example, the vehicle 100 may be a bi-directional vehicle configured to move such that either the first end 104 or the second end 106 may be a front end of the vehicle 100 or a rear end of the vehicle 100. With specific reference to FIG. 1, the first end 104 of the vehicle 100 is the front or leading end of the vehicle 100 and the second end 106 of the vehicle 100 is the rear or trailing end when the vehicle travels in a first direction 116. Similarly, the second end 106 of the vehicle 100 is the front or leading end of the vehicle 100 and the first end 104 of the vehicle 100 is the rear or trailing end when the vehicle 100 travels in a second direction 118 opposite the first direction 116. These example characteristics may facilitate greater maneuverability, for example, in small spaces or crowded environments, such as parking lots and urban areas, and may also facilitate continued operation of the vehicle under certain circumstances, e.g., in the event of failure of some functionality of the vehicle 100. Moreover, and in conjunction with the bi-directional functionality, the first end 104 and the second end 106 may be substantially identical. For example, in some implementations including the illustrated example, the vehicle may be substantially longitudinally symmetrical, i.e., about a plane to which the longitudinal axis 108 is normal. As illustrated, the vehicle 100 may also be substantially laterally symmetrical, i.e., about a plane to which the lateral axis 112 is normal.

The vehicle 100 may travel through an environment, relying at least in part on sensor data indicative of objects in the environment in order to determine trajectories of the vehicle 100. For example, as the vehicle 100 travels through the environment, one or more sensors (not shown) may be configured to capture data associated with detected objects (e.g., other vehicles, pedestrians, buildings, barriers, etc.). The data captured may be used, for example, as input for determining trajectories for the vehicle 100. In implementations of this disclosure, the sensors may include, but are not limited to, image capture devices, LIDAR sensors, and/or other types of sensors. In some embodiments, the sensors may not be necessary and/or can be omitted entirely.

To enable movement of the vehicle 100 in the environment, and as also illustrated in FIG. 1, the body 102 is carried by a plurality of wheels, including two first wheels 120a (only one of which is illustrated) and two second wheels 120b. As illustrated, one occurrence of the first wheels 120a and one occurrence of the second wheels 120b are disposed proximate the first end 104 of the vehicle 100 and the other occurrence of the first wheels 120a and the other occurrence of the second wheels 120b are disposed proximate the second end 106 of the vehicle 100. Each of the first wheels 120a includes a hub 122a, a rim 124a, and one or more first fins 126a, and each of the second wheels 120b includes a hub 122b, a rim 124b, and one or more second fins 126b. As will be described in more detail herein, in aspects of this disclosure, the first wheel 120a may be a mirror image of the second wheel 120b, which may improve the aerodynamic characteristics of the vehicle 100 regardless of whether the vehicle 100 is traveling in the first direction 116 or in the second direction 118. Though depicted as four wheels 120 in FIG. 1 for illustrative purposes, any number of wheels (e.g. two, three, or more than four) can be in any configuration to produce a desired aerodynamic effect in accordance with the techniques and articles described herein.

Figure 2B:
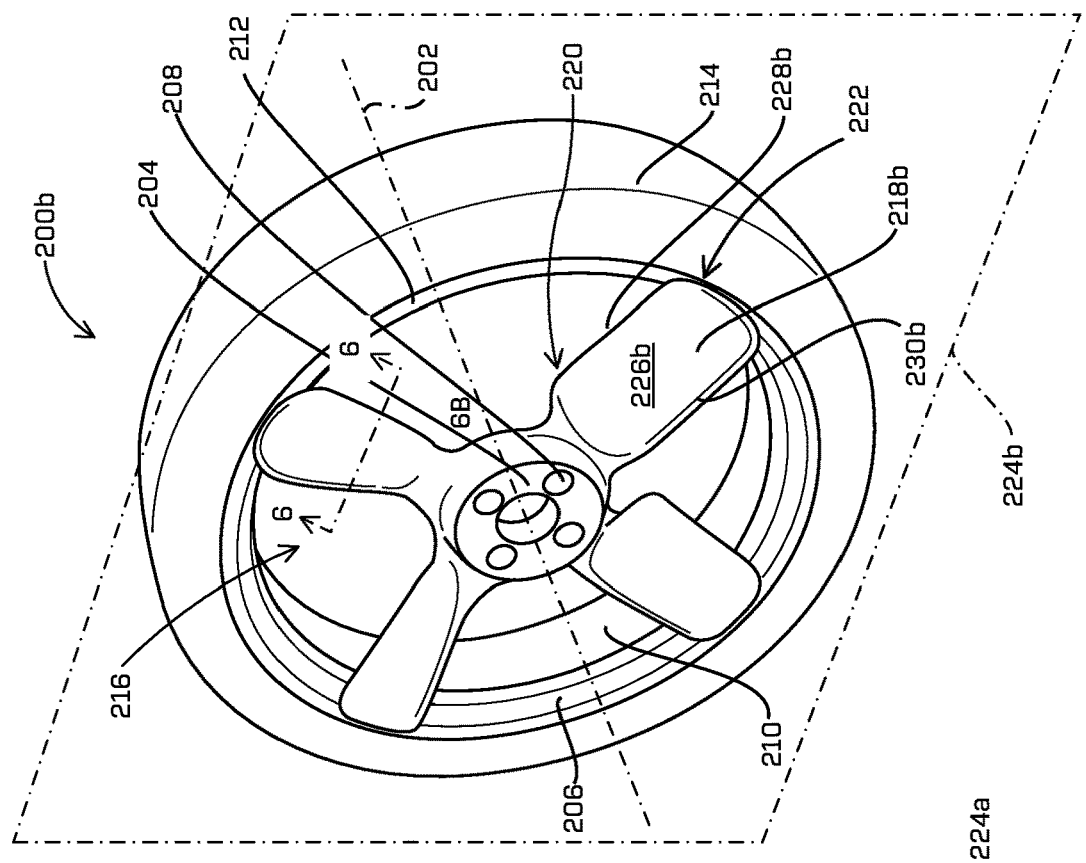
FIGS. 2A and 2B are perspective views of first and second wheels, which may be used on the vehicle illustrated in FIG. 1.
Figure 2A:
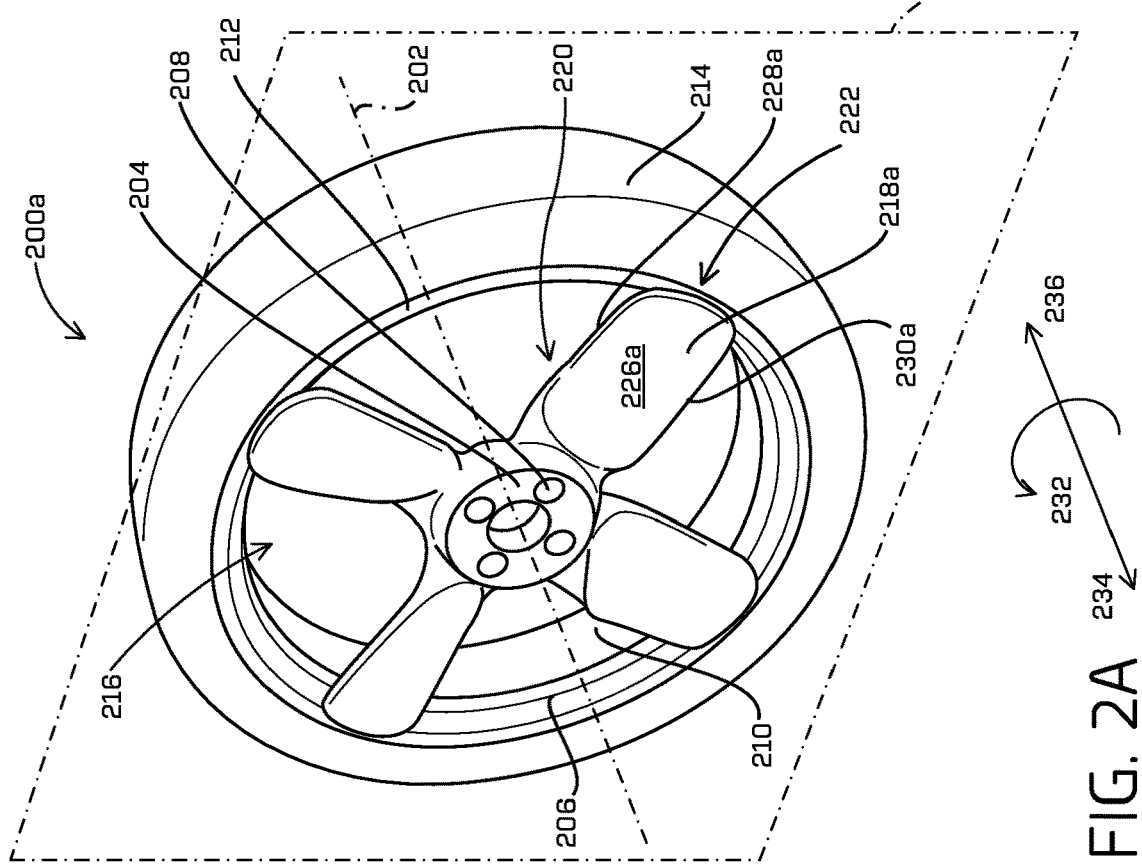

FIG. 2A is a perspective view illustrating a first wheel 200a, which may be one of the first wheels 120a in FIG. 1, and FIG. 2B is a perspective view illustrating a second wheel 200b, which may be one of the second wheels 120b in FIG. 1. The first wheel 200a has many features that generally correspond to features on the second wheel 200b, and as just discussed, the first wheel 200a may be substantially a mirror image of the second wheel 200b. Because of the similarity in structures, several of the features on the first wheel 200a may be substantially identical to features on the second wheel 200b. Accordingly, the same reference numerals are used in FIGS. 2A and 2B to illustrate components that may be substantially identical on the first and second wheels 200a, 200b. Where features differ between the first wheel 200a and the second wheel 200b and/or where it may be beneficial to clarify aspects of the disclosure, reference numerals may be appended with a suffix, i.e., with an "a" in FIG. 2A to describe aspects of the first wheel 200a or with a "b" in FIG. 2B to describe aspects of the second wheel 200b. In implementations of this disclosure, and as detailed further herein, a vehicle, such as the vehicle 100, may include two instances of the first wheel 200a and two instances of the second wheel 200b. For example, the two instances of the first wheel 200a may be diagonally opposite each other on the vehicle and the two instances of the second wheel 200b are diagonally opposite each other. As described herein, this example arrangement may create a similar aerodynamic effect whether the vehicle is traveling in either of opposite directions, such as the directions 116, 118 illustrated in FIG. 1.

Each of the first wheel 200a and the second wheel 200b is disposed to rotate about a wheel axis 202 and includes a hub 204 and a rim 206 radially spaced from the hub 204. As illustrated, the hub 204 may include one or more attachment features, such as one or more bolt holes 208 sized and positioned to receive corresponding wheel studs, i.e., for securing the respective wheel 200a, 200b to a vehicle. The bolt holes 208 are provided only as an example, and the wheels 200a, 200b are not limited to the use of the bolt holes for securement to a vehicle.

Additional or alternative attachment features may be provided to secure the wheels 200a, 200b to the vehicle 100. As also illustrated in FIGS. 2A and 2B, the rim 206 may include a surface 210 generally facing the axis 202, an outer sidewall 212, and an inner sidewall (not shown) spaced from the outer sidewall 212 in a direction parallel to the wheel axis 202. As used herein, "outer" may refer to a structure or surface that faces away from a longitudinal axis of a vehicle to which the wheel 200a, 200b is secured, e.g., an outer surface of the wheel 200a, 200b is away from the longitudinal axis 108 of the vehicle 100 when the wheel 200a, 200b is secured to the vehicle 100. In contrast, "inner" may refer to a structure or surfaces that faces toward the longitudinal axis of the vehicle to which the wheel 200a, 200b is secured, e.g., toward the longitudinal axis 108 of the vehicle 100 when the wheel 200a, 200b is secured to the vehicle 100. Accordingly, when the wheel axis 202 is aligned substantially parallel to a lateral axis of the vehicle, e.g., the lateral axis 112 of the vehicle 100, the outer sidewall 212 is relatively further from the longitudinal axis than the inner sidewall, in the lateral direction. In some implementations, the rim 206 may be contoured such that one or more of the surface 210, the outer sidewall 212, and the inner sidewall are formed as an integral, e.g., contoured, surface. For example, in such implementations, demarcations between the surface 210, the outer sidewall 212, and/or the inner sidewall may not be readily perceptible. In such instances, the outer sidewall 212 may be understood to be an outer portion, which may also be an outermost portion, of the rim 206 and the inner sidewall may be understood to be an inner portion, which may also be an innermost portion, of the rim 206, with the outer portion and the inner portion spaced from each other in a direction parallel to the wheel axis 202. The rim 206 also may be configured to carry a tread 214 although in some implementations, the tread 214 may be integrally formed with the rim 206, or the tread 214 may not be included.

An opening 216 is formed between the hub 204 and the rim 206, and the opening 216 extends through each of the wheels 200a, 200b. The first wheel 200a also includes a plurality of first fins 218a disposed in the opening 216, and the second wheel 200b includes a plurality of second fins 218b disposed in the opening 216. In the implementation of FIG. 1, the first fins 218a are spaced from each other, e.g., angularly about the hub 204 of the first wheel 200a, and the second fins 218b are spaced from each other, e.g., angularly about the hub 204 of the second wheel 200b. Also in the illustrated implementation, the first fins 218a and the second fins 218b may extend from the hub 204 to the rim 206, e.g., such that a first end 220 of the fins 218a, 218b contacts (and/or is integral with and/or attached to) the hub 204 and an opposite, second end 222 of the fins 218a, 218b contacts (and/or is integral with and/or attached to) the rim 206. Accordingly, the first fins 218a may function as spokes of the first wheel 200a and the second fins 218b may function as spokes of the second wheel 200b. As will be described further herein, the first fins 218a and the second fins 218b are configured to affect airflow at the wheels 200a, 200b, including by directing airflow through the opening 216. Although four first fins 218a and four second fins 218b are illustrated in FIGS. 2A and 2B, respectively, more or fewer first fins 218a and/or more or fewer second fins 218b may be provided.

Figure 6:
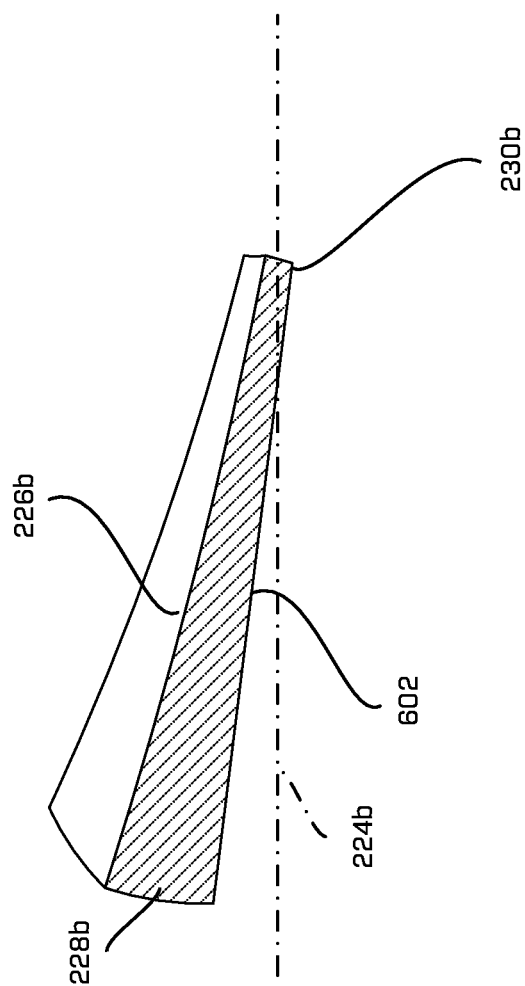
FIG. 6 is a cross-sectional view of an example of a fin taken along section line 6-6 in FIG. 2B, according to additional examples of this disclosure.

As illustrated in FIG. 2A, at least a portion of the first fins 218a is angled relative to a first plane 224a to which the wheel axis 202 of the first wheel 200a is perpendicular, and at least a portion of the second fins 218b is angled relative to a second plane 224b to which the wheel axis 202 of the second wheel 200b is perpendicular. More specifically, in the illustrated embodiment, each of the first fins 218a includes an outer surface 226a and each of the second fins 218b includes an outer surface 226b. At least a part of the outer surface 226a is disposed at an oblique angle relative to the first plane 224a and at least a portion of the outer surface 226b is disposed at an oblique angle relative to the second plane 224b. Each of the fins 218a, 218b also includes an inner surface (not shown) spaced from the respective outer surface 226a, 226b by a fin thickness. In implementations of this disclosure, the first fins 218a and/or the second fins 218b may have a constant thickness, e.g., with the inner surface having the same oblique angle relative to the respective plane, although such is not necessarily required. For example, FIG. 6 shows an example implementation in which an inner surface 602 is angled relative to the outer surface 226b, such that the fin thickness varies between a first edge 228a and a second edge 230a. Other modifications to the first fins 218a and/or the second fins 218b also are contemplated. For example, as also illustrated, the outer surface 226a (and the inner surface) has a width that extends between a first edge 228a and a second edge 230a and the outer surface 226b has a width that extends between a first edge 228b and a second edge 230b. The width may be the substantially the same along the radial length of the fins 218a, 218b, or, in some implementations, the width may vary with the radial position. Moreover, the oblique angle associated with the first fins 218a and the second fins 218b may vary along the radial length of the fins 218a, 218b. By way of non-limiting example, the first fins 218a, 218b may be contoured such that the angle varies at different positions on the fins 218a, 218b. For example, the fins 218a and 218b may appear to be twisted, e.g., about a radial dimension, or otherwise contoured to create a number of oblique angles along the fin (generally as shown in FIG. 6). Moreover, the outer surfaces 226a, 226b may be contoured, e.g., convex and/or concave. In addition, although the examples of FIGS. 2A and 2B illustrate substantially the entire radial length of each of the fins 218a, 218b as including the angled surface, e.g., the entirety of the fins 218a, 218b from the hub to the rim is twisted, in some implementations, less than all of the spoke may include the angled surface. By way of non-limiting example, the portion of the fin closest the hub may not be angled, e.g., to accommodate components behind fins 218a, 218b, including braking components or the like. As will be appreciated from this disclosure, the functionality of the fins 218a, 218b may be achieved through various configurations, including but not limited to the example surface arrangements and structures described herein.

Although both the outer surface 226a (and the inner surface in some implementations) of each first fin 218a is disposed at an oblique angle relative to the first plane 224a and the outer surface 226b (and the inner surface in some implementations) of each second fin 218b is disposed at an oblique angle relative to the second plane 224b, in implementations of this disclosure, the oblique angle(s) associated with the first fins 218a may be opposite or mirrored the oblique angle(s) associated with the second fins 218b. For example, as shown in FIG. 2A, along a portion of the radial length of each of the first fins 218a, an intersection of the outer surface 226a and the first edge 228a may be relatively closer, in a direction parallel to the wheel axis 202, to the outer sidewall 212 and an intersection of the outer surface 226a and the second edge 230a may be relatively closer, in that same direction, to the inner sidewall. In contrast, as shown in FIG. 2B, along a portion of the radial length of each of the second fins 218b, an intersection of the outer surface 226b and the first edge 228b may be relatively closer, in a direction parallel to the wheel axis 202, to the inner sidewall and an intersection of the outer surface 226b and the second edge 230b may be relatively closer, in that same direction, to the outer sidewall 212.

Accordingly, in examples of this disclosure, the first wheel 200a shown in FIG. 2A may be substantially a mirror-image of the second wheel 200b shown in FIG. 2B. As will be appreciated, this mirroring results in a substantially opposite impact on airflow at the respective wheels 200a, 200b. More specifically, when the first wheel 200a rotates in a first rotational direction 232 about the wheel axis 202, i.e., a counter-clockwise direction in the illustration of FIG. 2A, air impacted by the rotating first fins 218*a* is forced in a first direction 234. For example, and because of rotation of the first wheel 200*a* in the first rotational direction 232, air proximate the inner sidewall is forced through the opening 216 and exhausted from the opening 216 proximate the outer sidewall 212. In contrast, when the second wheel 200*b* rotates in the first rotational direction 232 about the wheel axis 202, air impacted by the rotating second fins 218*b* is forced in a second direction 236 opposite the first direction 234. For example, and because of rotating in the first rotational direction 232, air proximate the outer sidewall 212 is forced through the opening 216 and exhausted from the opening 216 proximate the inner sidewall. In implementations of this disclosure, the fins 218*a*, 218*b* will have the opposite effect when the wheels rotate in a second rotational direction opposite the first rotational direction 232. For example, when the first wheel 200*a* rotates in the second rotational direction about the wheel axis 202, i.e., clockwise in FIG. 2A, air proximate the outer sidewall 212 is forced through the opening 216 and exhausted from the opening 216 proximate the inner sidewall. Moreover, when the second wheel 200*b* rotates in the second rotational direction about the wheel axis 202, air proximate the inner sidewall is forced through the opening 216 and exhausted from the opening 216 proximate the outer sidewall 212.

As will be appreciated, the fins 218*a*, 218*b* impart the lateral direction on airflow, because one or more of the surfaces impacting the airflow are angled relative to the first plane 224*a* and the second plane 224*b*, respectively. For example, each of the outer surface 226*a* and the inner surface of the first fin 218*a* must be angled relative to the first plane 224*a* to cause air to flow through the opening 216 of the first wheel 200*a* regardless of the rotational direction the first wheel 200*a* rotates. Similarly, each of the outer surface 228*a* and the inner surface of the second fin 218*b* must be angled relative to the second plane 224*b* to cause air to flow through the opening 216 of the second wheel 200*b* regardless of the rotational direction the second wheel 200*b* rotates. Although not illustrated, in other implementations, the surfaces that impart the lateral motion on the air in the first direction 234 may be separate from, i.e., formed on different components than, the surfaces that impart the lateral motion of the air in the second direction 236. For example, in the illustrated embodiment, on two of the illustrated first fins 218*a*, the outer surfaces 226*a* of the fins 218*a* may be configured as shown, i.e., disposed at an oblique angle, but the inner surfaces of those two fins 218*a* may be substantially parallel to the first plane 224*a*. In this example, on the other two fins 218*a*, the outer surfaces 226*a* may be substantially parallel to the first plane 224*a* and the inner surfaces may be configured as shown, i.e., disposed at an oblique angle. Accordingly, in alternative examples including the one just described, some fins may be provided to impart lateral motion in the first direction and other fins may be provided to impart lateral motion in the second direction. In another example, the illustrated fins 218*a*, which are illustrated proximate the outer sidewall 212 of the first wheel 212 may be substantially duplicated proximate the inner sidewall. In such an example, the inner surfaces of the illustrated fins and the outer surfaces of the duplicate fins may be substantially parallel to the first plane 224*a*. In such an arrangement, the illustrated fins 218*a* would substantially only impart lateral movement of air in the first direction 234 and the duplicate fins proximate the inner sidewall would substantially only impart lateral movement of air in the second direction 236. As would be appreciated, in some examples, a different configuration (twist, width, length, etc.) may be used for each fin in a single wheel. In such configurations, various aerodynamic properties may be optimized based on a wheel position on the vehicle, direction of travel, and/or fin configuration.

Figure 3:
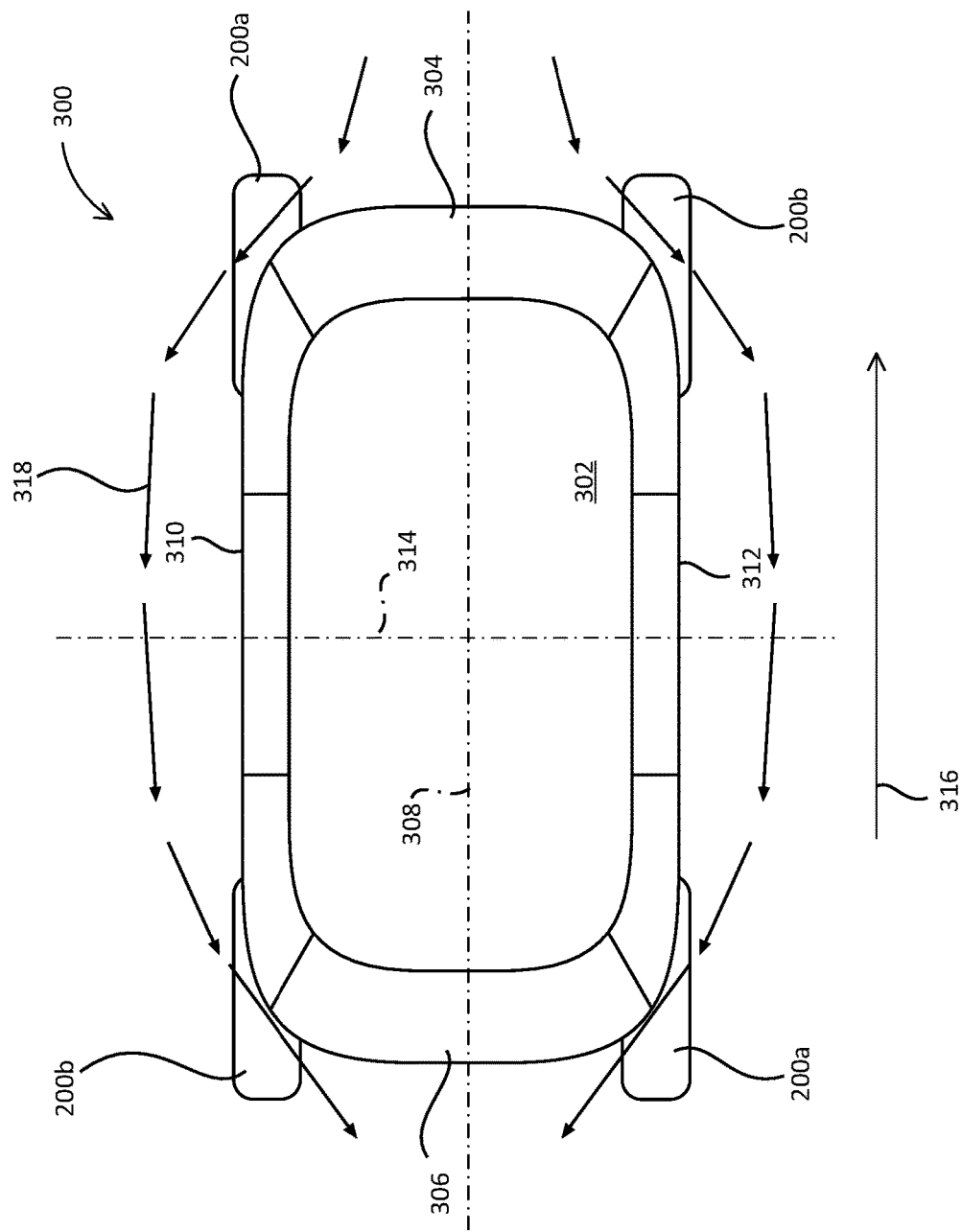
FIG. 3 is a top, plan view showing airflow characteristics for a vehicle, such as the vehicle shown in FIG. 1 having the wheels illustrated in FIGS. 2A and 2B when the vehicle travels in a first direction.

FIG. 3 is a top view of a vehicle 300, which may be the vehicle 100 in FIG. 1. FIG. 3 may be used to illustrate a use and configuration for the first wheels 200*a* and the second wheels 200*b*.

As illustrated in FIG. 3, the vehicle 300 includes a body 302 having a first end 304, a second end 306 spaced from the first end 304 along a longitudinal axis 308, a first side 310, and a second side 312 spaced from the first side 310 along a lateral axis 314. The body 302 is carried by four wheels, including two of the first wheels 200*a* and two of second wheels 200*b*. In the illustrated example, one of the first wheels 200*a* is disposed proximate the first end 304 and the first side 310 and the other of the first wheels 200*a* is disposed proximate the second end 306 and the second side 312. Moreover, one of the second wheels 200*b* is disposed proximate the first end 304 and the second side 312 and the other of the second wheels 200*b* is disposed proximate the second end 306 and the first side 310. Accordingly, the two first wheels 200*a* are diagonal each other and the two second wheels 200*b* are diagonal each other.

In a scenario illustrated by FIG. 3, the vehicle 300 is travelling in a first direction 316, generally parallel to the longitudinal axis 308, such that the first end 304 of the vehicle 300 is the leading end and the second end 306 is the trailing end. Arrows 318 are used to illustrate the effect the wheels 200*a*, 200*b* have on aerodynamics of the vehicle. Specifically, the arrows 318 illustrate that, at the leading end of the vehicle 300, air at the wheels 200*a*, 200*b* is pushed laterally outboard of the vehicle, i.e., away from the longitudinal axis 308, and, at the trailing end of the vehicle 300, air at the wheels 200*a*, 200*b* is pushed laterally inboard, i.e., toward the longitudinal axis. Although not illustrated, as will be appreciated, because of the arrangement of the first wheels 200*a* and the second wheels 200*b*, should the vehicle travel in a second direction opposite the first direction 316, i.e., such that the second end 306 is the leading end and the first end 304 is the trailing end, the wheels 200*a*, 200*b* will impart substantially the same effect on the airflow, i.e., pushing air laterally outboard at the leading end and pushing air laterally inboard at the trailing end. Accordingly, in implementations of this disclosure, regardless of a direction of travel of the vehicle, the wheels proximate the leading end will push air laterally outward relative to the longitudinal axis 308 and the wheels proximate the trailing end will push air laterally toward the longitudinal axis 308.

The effect on the airflow may have several benefits. For example, without the wheel configurations described herein, air at the leading end of the vehicle 300 may be trapped between the wheel and the body, increasing drag. However, the wheels 200*a*, 200*b* described herein may promote exhausting that air, thereby decreasing drag and improving aerodynamic effects at the leading end. Moreover, without the wheel configurations described herein, air at the trailing end may pass as laminar flow outside the wheels, creating a wake that is at least as wide as the body. In implementations of this disclosure, however, the wheels at the trailing end have the effect of tapering the wake associated with the vehicle, which thereby improves the aerodynamics of the vehicle. Accordingly, the wheels 200*a*, 200*b* described herein, and their arrangement, provide aerodynamic benefits at the leading end of the vehicle and at the trailing end of the vehicle, regardless of which end of the vehicle is the leading end and which is trailing.

Although the four-wheel design illustrated in FIG. 3 benefits from the wheels and wheel configurations described herein, other designs may also benefit. Many arrangements that include a pair of wheels comprising an instance of the first wheel 200a laterally spaced from the second wheel 200b may improve aerodynamics of the vehicle. By way of non-limiting example, consider a case in which the first wheel 200a and the second wheel 200b proximate the back end 306 are replaced with a single, centrally-located wheel. In this example case, a pair of wheels comprising the first wheel 200a and the second wheel 200b may still provide the aerodynamic effects described above, i.e., whether the vehicle 300 travels in the first direction 316 or the opposite direction.

Figure 4A:
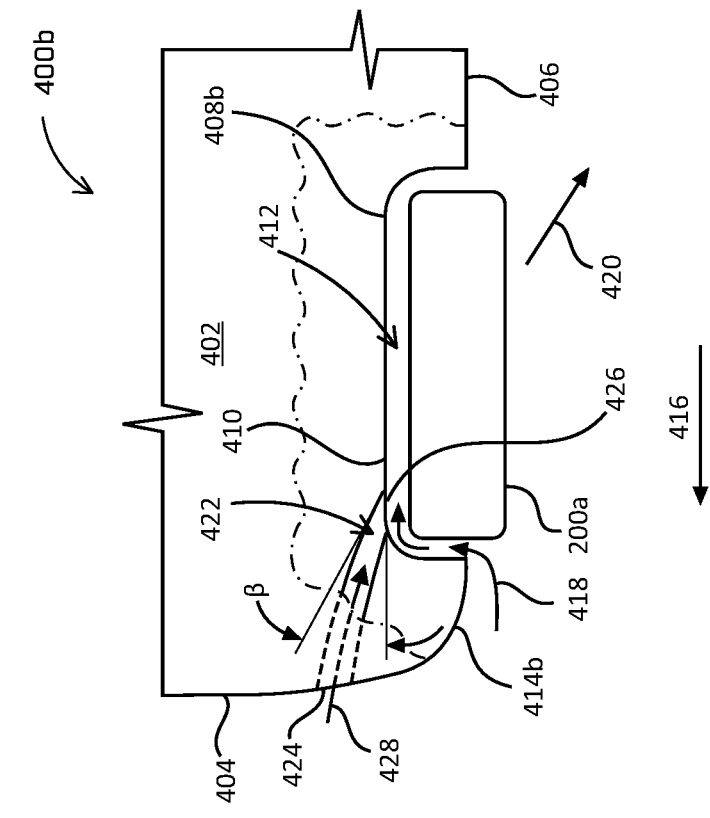
FIGS. 4A and 4B are partial top, plan views showing airflow characteristics for additional vehicle designs having the wheel illustrated in FIG. 2A when the vehicles travel in a first direction.
Figure 4B:
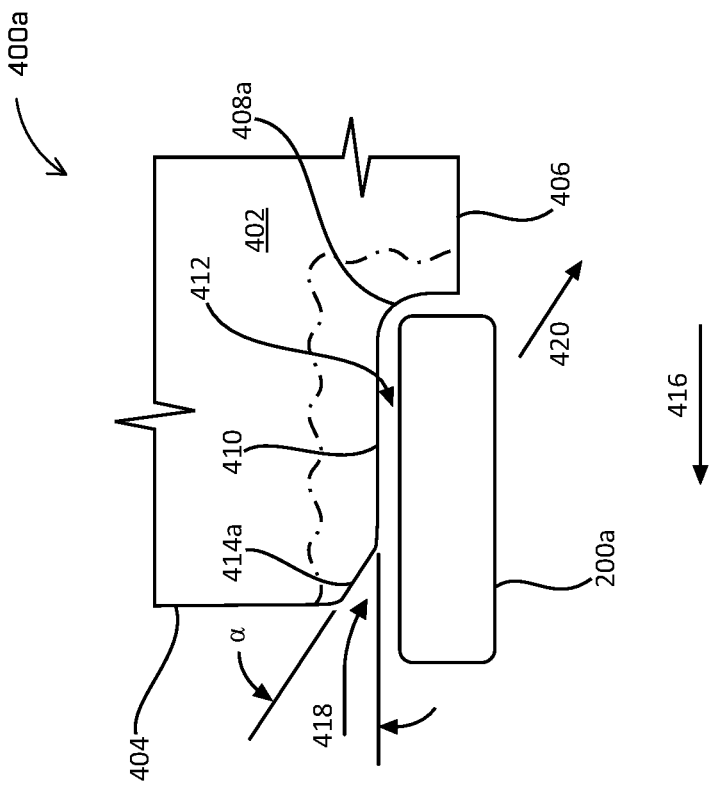

In FIG. 3, the vehicle 300 has an open wheel design, in which at least a portion of the wheels 200a, 200b is exposed. More specifically, when the vehicle 300 travels in the first direction 316, a leading surface of the leading wheels 200a, 200b is exposed to ambient air and air flows readily between the wheel and the body. Implementations of this disclosure may see increased improvements in this type of architecture, because, as discussed above, the wheels 200a, 200b may be well suited to force air through the opening 216, laterally away from the body and may be able to further increase the tapering at the trailing end. However, the wheels 200a, 200b and wheel arrangements described herein are not limited to open-wheel designs. Aerodynamic benefits may also be achieved in closed wheel designs, in which each of the wheels is substantially disposed in a wheel well, e.g., in a fender. FIGS. 4A and 4B show examples of these alternative configurations.

More specifically, FIGS. 4A and 4B are partial cut-away, plan views of vehicles 400a, 400b. FIG. 4A illustrates an embodiment similar to FIG. 3, in which the vehicle 400a has an open-wheel design. More specifically, the vehicle 400a has a body 402 including an end 404 and a side 406. A portion of the body 404 is removed (as shown by the sectioning line) to illustrate a wheel well 408a disposed proximate the intersection junction of the end 404 and the side 406 and the wheel 200a disposed in the wheel well 408a. An inner sidewall of the wheel 200a is spaced from a wheel well surface 410, forming a void 412 therebetween. A transitional surface 414a is formed as a contoured surface at the junction of the end 404 and the wheel well surface 410.

As illustrated, the end 404 and the wheel well surface 410 are substantially perpendicular to each other and the transitional surface 414a extends therebetween. Accordingly, the transitional surface 414a is angled relative to the wheel well surface 410, e.g., by an angle α. When the vehicle travels in a direction 416 in which the end 404 is a leading end, air enters the void 412 between the wheel well surface 410 and the wheel 200a, generally as shown by arrow 418. As described above in connection with FIG. 3, the fins 218a on the wheels 200a force this air in the void 412 through the wheel 200a, outboard of the vehicle 400a, generally along a direction shown by arrow 420.

In some embodiments, the body 402 styling may impact the design of the wheel 200a, and more particularly, impact the design of the fins 218a. For example, the oblique angle at which the outer surface 226a of the fins 218a is arranged may be determined based on the angle at which air impacts the inner surface of the wheel 200a. In the example of FIG. 4A, airflow may be directed along the transitional surface 414a, i.e., generally at the angle α, and the fins 218a may be configured such that the oblique angle of the outer surface 226a is the same as or approximately the same as the angle α. Moreover, in alternative arrangements in which the oblique angle varies along the fins 218a, the oblique angle may approximate the angle α only at a portion of the fin. The angle α may vary, e.g., depending upon design choice or desired aerodynamic effect, from any angle greater than zero-degrees and less than 90-degrees. Moreover, although for simplicity the transitional surface 242a is shown as generally planar between the end 404 and the wheel well surface 410, the transitional surface 414a and/or the wheel well surface 410 may be contoured or non-planar. Accordingly, the angle α may be measured between lines that are tangential to or otherwise representative of the respective surfaces, and, in turn, the fins may be designed based on the angle(s) between the tangential and/or representative lines.

FIG. 4B shows an example in which the vehicle 400b is a closed-wheel vehicle. More specifically, the vehicle 400b has the body 402 including the end 404 and the side 406. A portion of the body 402 is removed (as shown by the sectioning line) to illustrate a wheel well 408b disposed in the side 406 and the wheel 200a disposed in the wheel well 408b. An inner sidewall of the wheel 200a is spaced from the wheel well surface 410, forming the void 412 therebetween. Unlike the embodiment of FIG. 4A, the wheel well 408 is spaced from the end 404, e.g., by a fender 414b.

Because the wheel well 408b is spaced from the end 404, airflow does not directly enter the void 412, as in FIG. 4A. Instead, and as illustrated in FIG. 4B, some airflow enters the void by wrapping around the fender 414b, as shown by the arrows 418. As in the embodiments described above, the fins 218a on the wheels 200a force this air in the void 412 through the wheel 200a, outboard of the vehicle 400a, generally along a direction shown by arrow 420.

As also illustrated in FIG. 4B, the vehicle 400b may also include a channel 422 formed in the body 402. For example, the channel 422 may extend from a first opening 424 at the end 404 to a second opening 426 in the wheel well 408b, e.g., at the wheel well surface 410. With this configuration, and when the vehicle travels in the direction shown by the arrow 416, the channel 422 directs air at the end 404 of the vehicle 400b to the void 412, generally as illustrated by an arrow 428. This airflow may provide a cooling effect on braking components, for example. With the illustrated arrangement, the fins 218a on the wheels 200a force this air in the void 412 through the wheel 200a, outboard of the vehicle 400a, generally along the direction shown by arrow 420.

As discussed above in conjunction with the configuration of FIG. 4A, the body 402 styling may impact the design of the wheel 200a, and more particularly, impact the design of the fins 218a. For example, the oblique angle at which the outer surface 226a of the fins 218a is arranged may be determined based on the angle at which air impacts the inner surface of the wheel. In the example of FIG. 4B, airflow may be directed by the channel 422 generally at an angle β, and the fins 218a may be configured such that the oblique angle of the outer surface 226a (or at least a portion thereof) is the same as or approximately the same as the angle β.

In addition to modifications to the configuration of the vehicle and to the styling of the vehicle body, the wheels may also be modified. For example, FIGS. 5A and 5B illustrate, respectively, planar views of a first wheel 500a and a second wheel 500b according to additional examples of this disclosure.

Each of the first wheel 500a and the second wheel 500b is disposed to rotate about a wheel axis 502 and includes a hub 504 and a rim 506 radially spaced from the hub 504. As illustrated, the hub 504 may include one or more attachment features, such as one or more bolt holes 508 sized and positioned to receive corresponding wheel studs, i.e., for securing the respective wheel 500a, 500b to a vehicle. The wheels 500a, 500b may have additional or alternative attachment features than the illustrated bolt holes 508. The rim 506 may include a surface 510 generally facing the axis 502, an outer sidewall 512, and an inner sidewall (not shown) spaced from the outer sidewall 512 in a direction parallel to the wheel axis 502. As used herein, and as discussed above in connection with the wheels 200a, 200b, "outer" may be used to describe a surface or feature that faces or is positioned relatively away from a longitudinal axis of a vehicle to which the wheels 500a, 500b are secured, e.g., away from the longitudinal axis 108 of the vehicle 100 when the wheels 500a, 500b are secured to the vehicle 100. In contrast, "inner" may be used to describe a surface or feature that faces or is positioned relatively toward the longitudinal axis of the vehicle to which the wheels 500a, 500b are secured, e.g., toward the longitudinal axis 108 of the vehicle 100 when the wheels 500a, 500b are secured to the vehicle 100. Accordingly, when the wheel axis 502 is aligned parallel to a lateral axis of the vehicle, e.g., the lateral axis 112 of the vehicle 100, the outer sidewall 512 is relatively further from the longitudinal axis in the lateral direction than the inner sidewall. As illustrated in FIGS. 5A and 5B, the surface 510 of the rim 506 may be convex, although other contours or cross-sections may alternatively be used. Although in some implementations there may be no clear demarcation between any or all of the surface 510, the outer sidewall 512, and the inner sidewall, the outer sidewall 512 may be understood to be an outer portion, which may also be an outermost portion, of the rim 506 and the inner sidewall may be understood to be an inner portion, which may also be an innermost portion, of the rim 506, with the outer portion and the inner portion spaced in a direction parallel to the wheel axis 502. The rim 506 may be configured to carry a tread 514 although in some implementations, the tread 514 may be integrally formed with the rim 506, or the tread 514 may not be included.

Figure 5A:
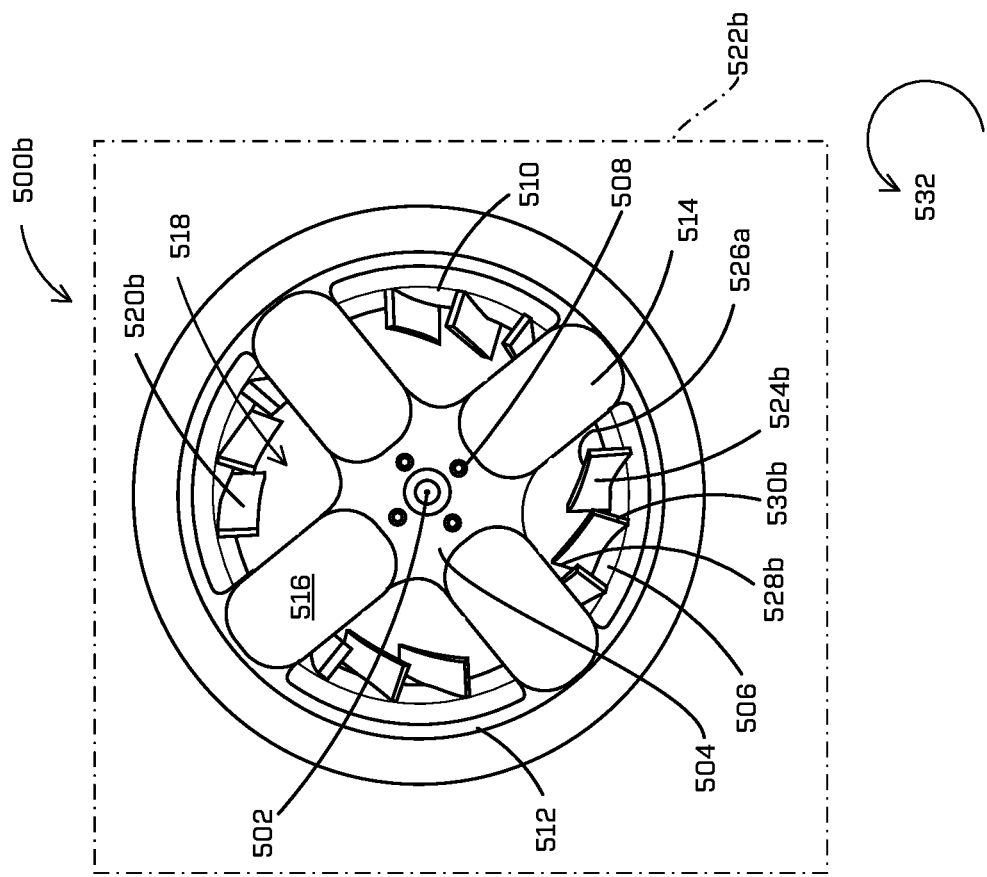
FIGS. 5A and 5B are side views of first and second wheels, which may be used on the vehicle illustrated in FIG. 1, according to additional examples of this disclosure.
Figure 5B:
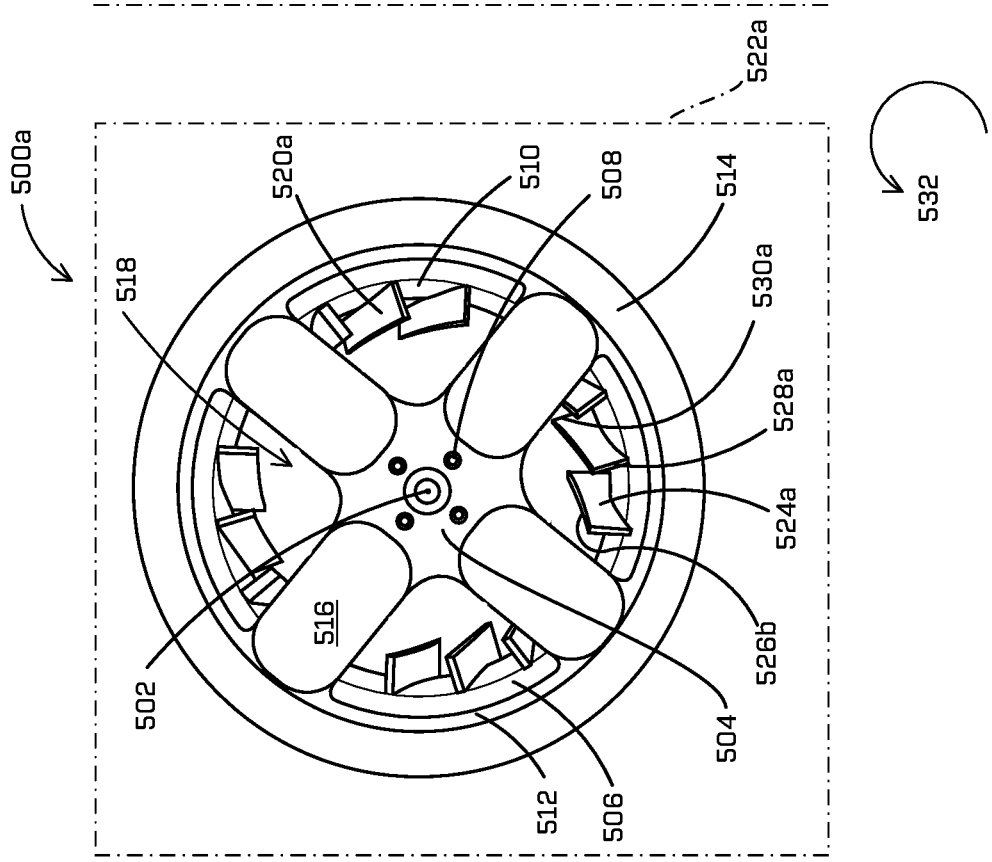

As also illustrated in FIGS. 5A and 5B, one or more spokes 516 may extend from the hub 504 to the rim 506. Although four, equally-spaced spokes 516 are illustrated, more or fewer spokes may be provided. The hub 504, the rim 506, and the spokes 516 define a plurality of openings 518 extending through each of the wheels 500a, 500b. Unlike the wheels 200a, 200b discussed above, the spokes 516 may not be configured as fins (although the spokes may be configured like the fins 218a, 218b discussed above). Instead, the first wheel 500a includes a plurality of spaced-apart first fins 520a and the second wheel 500b includes a plurality of spaced-apart second fins 520b. The first fins 520a project radially inward, i.e., toward the hub 502, from the surface 510 of the first wheel 500a and the second fins 520b project radially inward from the surface 510 of the second wheel 500b. The first fins 520a and the second fins 520b are generally disposed in the openings 518, but may not extend all the way to the hub 502. Although configured differently from the first fins 218a and the second fins 218b, the first fins 520a and the second fins 520b function similarly, e.g., by affecting airflow at the wheels 500a, 500b, respectively, including by directing airflow through the openings 518. Although twelve first fins 520a and twelve second fins 520b are illustrated in FIGS. 5A and 5B, respectively, more or fewer fins 520a, 520b, may be provided. Moreover, the spacing between the fins 520a, 520b may vary and/or the fins may be relatively longer or shorter.

As illustrated in FIG. 5A, the first fins 520a are obliquely angled relative to a first plane 522a to which the wheel axis 502 of the first wheel 500a is perpendicular, and the second fins 520b are angled relative to a second plane 522b to which the wheel axis 502 of the second wheel 500b is perpendicular. More specifically, in the illustrated embodiment, each of the first fins 520a includes an outer surface 524a and an inner surface 526a spaced from the outer surface 524a by a fin thickness, and each of the second fins 520b includes an outer surface 524b and an inner surface 526b spaced from the outer surface 524b by a fin thickness. The outer surface 524a and the inner surface 524b are disposed at an oblique angle relative to the plane 522a and the outer surface 524b and the inner surface 526b are disposed at an oblique angle relative to the second plane 522b. In the illustrated examples. the first fins 520a and/or the second fins 520b may have a constant thickness, although in other implementations the thickness may vary. Moreover, although the outer surfaces 524a, 524b and the inner surfaces 526a, 526b are illustrated as generally planar, in other embodiments, one or more of those surfaces may be contoured, e.g., concave or convex.

As noted above, the fins 520a, 520b, e.g. the outer surfaces 524a, 524b and the inner surfaces 526a, 526b are disposed at oblique angles relative to the respective first and second planes 522a, 522b. However, in implementations of this disclosure, as in the wheels 200a, 200b discussed above, the oblique angle associated with the first fins 520a is opposite or mirrored the oblique angle associated with the second fins 502b. For example, as shown in FIG. 5A, along a portion of the radial length of each of the first fins 520a, a first edge 528a may be relatively closer to the outer sidewall 512, in a direction parallel to the wheel axis 502, and a second edge 530a may be relatively closer to the inner sidewall, in that same direction. In contrast, as shown in FIG. 5B, along a portion of the radial length of each of the second fins 520b, a first edge 528b may be relatively closer to the inner sidewall, in a direction parallel to the wheel axis 502, and a second edge 530b may be relatively closer to the outer sidewall 512, in that same direction. Of course, though all fins 520 of each wheel are depicted in FIGS. 5A, 5B as having the same configuration (height, width, obliqueness, etc), each fin 520a or 520b may have differing configurations so as to optimize a particular desired aerodynamic effect in accordance with any techniques or articles described herein.

As a result of the different orientation of the first fins 520a and the second fins 520b, the first wheel 500a may be substantially a mirror-image of the second wheel 500b. Accordingly, like the wheels 200a, 200b discussed above, the first wheel 500a has generally the opposite impact on airflow than the second wheel 500b. More specifically, when the first wheel 500a rotates in a first rotational direction 532 about the wheel axis 502, i.e., a counter-clockwise direction in the arrangement of FIG. 5A, air impacted by the rotating first fins 520a is forced in a first direction normal to the first plane 522a. For example, air proximate the inner sidewall is forced through the opening 518 and exhausted from the opening 518 proximate the outer sidewall 512. In contrast, when the second wheel 500b rotates in the first rotational direction 532 about the wheel axis 502, air impacted by the rotating second fins 520b is forced in a second direction opposite the first direction. For example, air proximate the outer sidewall 512 is forced through the opening 518 and exhausted from the opening 518 proximate the inner sidewall. In implementations of this disclosure, the fins 518a, 518b will have the opposite effect when the wheels rotate in a second rotational direction opposite the first rotational direction 532. For example, when the first wheel 500a rotates in the second rotational direction about the wheel axis 502, i.e., clockwise in FIG. 5A, air proximate the outer sidewall 512 is forced through the opening 518 and exhausted from the opening 516 proximate the inner sidewall. Moreover, when the second wheel 500b rotates in the second rotational direction about the wheel axis 502, air proximate the inner sidewall is forced through the opening 518 and exhausted from the opening 518 proximate the outer sidewall 512.

As will be appreciated, the first wheel 500a functions in substantially the same manner as the first wheel 200a and the second wheel 500b function in substantially the same way as the second wheel 200b. For example, replacing each of the two instances of the first wheel 200a with the first wheel 500a and replacing each of the two instances of the second wheel 200b with the second wheel 500b on the vehicle 300 of FIG. 3 will result in substantially the same airflow pattern as that illustrated by the arrows 312.

Thus, according to implementations of this disclosure, aerodynamic features may be provided on wheels, e.g., in the form of fins. The features, and in some instances in combination with an arrangement of wheels having the features, may impart an aerodynamic benefit to a vehicle having the wheels. While FIGS. 2A, 2B, 5A and 5B show example wheels 200a, 200b, 500a, 500b, and some modifications to those wheels have been discussed herein, additional modifications may be appreciated with the benefit of this disclosure. For example, many modifications may be made to one or more of the wheels 200a, 200b, 500a, 500b and/or to one or more of the fins 218a, 218b, 520a, 520b. In some instances, dimensions of the wheels and/or of the fins may be modified, with certain modifications altering the aerodynamic gains achieved by implementations of this disclosure. By way of non-limiting example, modifying the oblique angle at which the fins are disposed, the number of fins used, the effective surface area of the fins used, the size of the openings through the wheels, or the like, may all influence airflow around the vehicle, but such modifications are within the scope of this disclosure.

Moreover, although implementations of this disclosure describe using identical wheels at opposite corners of a vehicle, e.g., at positions generally diagonal each other, those diagonally-arranged wheels need not be identical. For example, improved aerodynamic functionality of the vehicle illustrated in FIG. 3 may still be achieved by replacing the first wheel 200a and the second wheel 200b proximate the first end 304 of the vehicle 300 with the first wheel 500a and the second wheel 500b, respectively. In implementations of this disclosure, regardless of the exact design, the wheels proximate a leading end of the vehicle may promote lateral movement of airflow away from the longitudinal axis and the wheels proximate the trailing end of the vehicle may promote lateral movement of airflow toward the longitudinal axis, as generally illustrated in FIG. 3, regardless of the direction of travel of the vehicle.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described.

Rather, the specific features and components are disclosed as exemplary forms of implementing the claims.

What is claimed is:

1. A vehicle wheel comprising:
a hub disposed to rotate about a wheel axis;
a rim radially spaced from the hub; and
a fin comprising a surface extending between a first end coupled to the hub and a second end coupled to the rim, wherein at least a portion of the surface is angled relative to a plane to which the wheel axis is normal, wherein:

when the vehicle wheel rotates clockwise about the wheel axis, the fin pushes substantially all air impinging on the fin laterally in a first direction along the wheel axis; and when the vehicle wheel rotates counterclockwise about the wheel axis, the fin pushes substantially all air impinging on the fin laterally in a second direction along the wheel axis, opposite the first direction.

2. The vehicle wheel of claim 1, wherein the fin is a first fin, the vehicle further comprising:
at least one additional fin comprising a second fin surface extending between a third end coupled to the hub and a fourth end coupled to the rim, at least a portion of the second fin surface being angled relative to the plane, the at least one additional fin being angularly offset from the first fin by an angle about the wheel axis to define an opening between the fin and the at least one additional fin.

3. The vehicle wheel of claim 2, wherein:
when the vehicle wheel rotates clockwise about the wheel axis, at least one of the fin or the at least one additional fin pushes air in a first direction through the opening; and
when the vehicle wheel rotates counterclockwise about the wheel axis, at least one of the fin or the at least one additional fin pushes air in a second direction through the opening.

4. The vehicle wheel of claim 1, wherein:
the surface is a first surface separated from a second surface of the fin by a fin thickness; and
the fin thickness is a constant thickness along a length of the fin extending from the first end to the second end.

5. The vehicle wheel of claim 1, wherein:
the surface is a first surface separated from a second surface of the fin by a fin thickness;
the fin extends between a leading edge and a trailing edge; and
the fin thickness varies between the leading edge and the trailing edge.

6. A vehicle wheel comprising:
a hub disposed to rotate about a wheel axis;
a rim radially spaced from the hub; and
a fin comprising a surface extending between the hub and the rim, wherein at least a portion of the surface is angled relative to a plane to which the wheel axis is normal, wherein:
when the vehicle wheel rotates clockwise about the wheel axis, the fin pushes substantially all air impinging on the fin laterally in a first direction along the wheel axis; and
when the vehicle wheel rotates counterclockwise about the wheel axis, the fin pushes substantially all air impinging on the fin laterally in a second direction along the wheel axis, opposite the first direction.

7. The vehicle wheel of claim 6, wherein the fin is a first fin, the vehicle further comprising:
at least one additional fin comprising a second fin surface extending between a third end coupled to the hub and a fourth end coupled to the rim, at least a portion of the second fin surface being angled relative to the plane, the at least one additional fin being angularly offset from the first fin by an angle about the wheel axis to define an opening between the fin and the at least one additional fin.

8. The vehicle wheel of claim 7, wherein:
when the vehicle wheel rotates clockwise about the wheel axis, at least one of the fin or the at least one additional fin pushes air in a first direction through the opening; and
when the vehicle wheel rotates counterclockwise about the wheel axis, at least one of the fin or the at least one additional fin pushes air in a second direction through the opening.

9. The vehicle wheel of claim 7, wherein:
the fin extends from a first fin end to a second fin end; and
at least one of:
the first fin end is coupled to the hub; or
the second fin end is coupled to the rim.

10. The vehicle wheel of claim 6, further comprising:
one or more spokes extending from the hub to the rim, the spokes being separate from the fin.

11. The vehicle wheel of claim 6, wherein:
the surface extends in a first direction between a first fin end and a second fin end and in a second direction between a leading edge and a trailing edge;
the surface is a first surface separated from a second surface of the fin by a fin thickness; and
the fin thickness varies between the leading edge and the trailing edge.

12. A vehicle wheel comprising:
a hub disposed to rotate about a wheel axis;
a rim spaced from the hub by a radial distance; and
a plurality of fins extending radially between the hub and the rim, a first fin of the plurality of fins being spaced rotationally about the wheel axis from a second fin of the plurality of fins and defining an opening between the first fin and the second fin,
wherein when the vehicle wheel rotates clockwise about the wheel axis, the plurality of fins pushes substantially all air impinging on the plurality of fins in a first direction through the opening, and
wherein when the vehicle wheel rotates counterclockwise about the wheel axis, the plurality of fins pushes substantially all air impinging on the plurality of fins in a second direction through the opening.

13. The vehicle wheel of claim 12, wherein:
the first fin has a first surface extending between the hub and the rim, wherein at least a portion of the first surface is angled relative to a plane to which the wheel axis is normal.

14. The vehicle wheel of claim 13 wherein a first end of the first fin is coupled to the hub and a second end is coupled to the rim.

15. The vehicle wheel of claim 14, wherein:
the first fin includes a first surface and a second surface separated by a fin thickness;
the first surface and the second surface extend between a leading edge and a trailing edge of the first fin; and
the fin thickness varies between the leading edge and the trailing edge.

16. The vehicle wheel of claim 1, wherein:
the first fin includes a first surface and a second surface substantially parallel to the first surface.

17. The vehicle wheel of claim 12, wherein:
the first fin includes a first surface and a second surface substantially parallel to the first surface.

* * * * *